Figure 1:
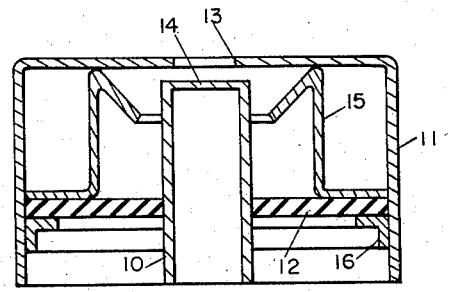

May 12, 1959          L. T. MAY          2,886,729

GRID-CATHODE STRUCTURE FOR CATHODE RAY TUBES

Filed Oct. 8, 1953

INVENTOR.
LAWRENCE T. MAY
BY Darby & Darby
ATTORNEYS

United States Patent Office 2,886,729
Patented May 12, 1959

2,886,729

GRID-CATHODE STRUCTURE FOR CATHODE RAY TUBES

Lawrence T. May, Cedar Grove, N.J., assignor to Allen B. Du Mont Laboratories, Inc., Clifton, N.J., a corporation of Delaware Application October 8, 1953, Serial No. 384,870

1 Claim. (Cl. 313—85)

The present invention relates to the grid-cathode structures of cathode ray tubes and particularly to the simplification of the construction of such assemblies to make possible the production of grids of high strength without the use of spacers and retainers.

In the usual construction of cathode ray tubes the first grid and the cathode assembly are assembled together as a unit the grid being a cylindrical structure having a closed end with a central aperture therein and the cathode being a smaller cylindrical structure having a closed end opposite the aperture in the grid, the cathode being held concentrically within the grid structure by a disk and being spaced in an axial direction from the closed end of the grid by spacing members against which the insulated disk is seated, the disk being held against the spacers by a ring welded or otherwise fixed to the interior surface of the grid.

In accordance with the present invention the grid is cylindrical and is provided with a closed end in the shape of a conical frustrum, an aperture being provided centrally of the top of the frustrum. The juncture between the cylindrical portion of the grid provides a shoulder against which may be placed the usual insulating disk to which the cathode is fixed, to thereby space the end of the cathode from the smaller section or top of the conical frustrum, thus eliminating the spacers used in the older construction. Means are also provided to hold the cathode in position without providing separate retaining means thereby further simplifying the construction of the assembly. Additionally, due to the reduced area of the flat top surface formed by the utilization of the conical frustrum, this top surface may be coined thus producing a thin grid surface adjacent the cathode without having unduly thin side walls and without the probability of side walls of non-uniform thickness. This is especially important in grid-cathode structures for high definition cathode ray tubes.

It is an object of the invention to provide a grid-cathode structure for a cathode ray tube in which no spacing members and retaining members separate from the structure are necessary.

It is another object of the invention to provide such a grid-cathode structure the grid of which terminates in a conical frustrum with the smaller flat side or top of the conical frustrum adjacent the end of the cathode.

It is still another object of the invention to provide a grid structure having that portion of the grid adjacent the cathode end very thin in an axial direction whereby high definition may be secured without having grid walls so thin or of such varying thickness as to be greatly reduced in strength.

Figure 2:
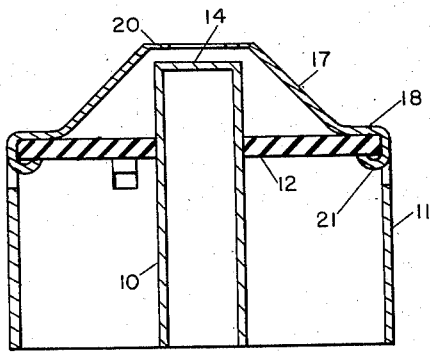
Figure 3:
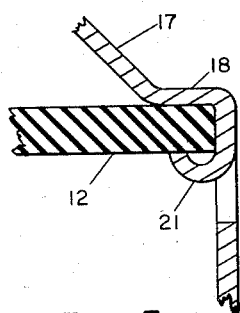

Other objects and features of the invention will be apparent when the following description is considered in connection with the annexed drawings, in which, Figure 1 is a transverse cross-sectional view of the presently used grid-cathode structure;

Figure 2 is a similar cross-sectional view of a grid-cathode structure made in accordance with my invention; and Figure 3 is a fragmentary cross-sectional view of Figure 2 showing particularly the mode of holding the cathode in position within the grid structure without the use of separate retaining means, this being accomplished by means of tabs bent off from the cylindrical portion of the grid.

Referring now to the drawings, and especially to Figure 1, it will be seen that the presently used construction comprises a hollow cathode 10 which is placed within the cylindrical grid 11, the cathode being fixed concentrically within an insulating spacer disk 12 which spaces it from the side walls of the grid 11. The grid 11 is provided with an aperture 13 at its upper end as seen in Figure 1 and the cathode end 14 is spaced from the inner surface of the end of the grid by means of the spacing members 15 which extend between the inner surface of the grid end wall and the disk 12. The structure is held in this position by means of a suitable retaining ring 16 which is welded or otherwise suitably fixed to the side walls of the grid 11.

Referring now to Figure 2 it will be seen that by my construction the spacers 15 and retaining ring 16 are eliminated. In the new structure the hollow cathode 10 is again provided with an insulating spacing disk 12 which locates the cathode on the axis of the cylindrical grid. In this new structure, however, the grid 11 terminates in a conical frustrum 17, the interior of the upper surface of which lies adjacent the end 14 of the cathode 10. Further, a shoulder 18 is formed where the conical frustrum joins the cylindrical portion of the grid structure the proportions being such that when the spacer disk 12 lies against the shoulder 18 the relationship of the cathode end 14 to the surface of the upper circular base of the conical frustrum is correct.

As is clearly seen in Figure 2 the upper base of the conical frustrum is reduced in thickness as indicated at 20. This is accomplished by coining the portion of the conical frustrum comprising the upper base 20 which it would be impossible to do with the old structure because the working area would be too large and because there would be no area for the metal displaced during the coining operation to occupy.

As was indicated above and as shown in Figure 2, the new structure not only eliminates the spacer but also eliminates the use of the retaining ring 16. In my new structure the grid has tabs punched therefrom just beneath the spacer disk 12 and these tabs, designated 21, are bent inwardly and upwardly against the lower surface of the spacer disk 12 to thereby hold that disk against the shoulder 18, thus fixing the disk and the cathode carried thereby in a definite position with respect to the grid structure.

As a result of the present improvements the grid-cathode structure is simplified by the elimination of the separate spacers and retaining ring and the assembly is much simplified. Moreover, the portion of the grid adjacent the cathode end may be made thinner to provide a high definition cathode ray tube and all of this without in any way lessening the mechanical strength of the structure.

While I have described preferred embodiments of my invention it will be understood that many other modifications may be made without deviating from the principles thereof; therefore I wish to be limited not by the foregoing description, but solely by the claim granted to me.

What is claimed is:

A grid cathode structure for a cathode ray tube comprising a control grid having a hollow cylindrical body portion terminating in a substantially closed conical frustum portion and an axially mounted cathode extending into said conical portion, said substantially closed conical frustum having a small aperture therein, said cathode positioned in a central portion in an insulating disk, said disk being fixedly mounted against the shoulder formed at the juncture of said cylindrical and conical grid portions by ears formed integrally with said body portion and bent inwardly against said disk.

References Cited in the file of this patent

UNITED STATES PATENTS

| | | |
|---|---|---|
| 2,099,111 | Hefele | Nov. 16, 1937 |
| 2,099,531 | Passarge | Nov. 16, 1937 |
| 2,144,998 | Treschan | Jan. 24, 1939 |
| 2,310,811 | Schantl et al. | Feb. 9, 1943 |
| 2,436,265 | Pohl et al. | Feb. 17, 1948 |
| 2,632,130 | Hull | Mar. 17, 1953 |
| 2,644,906 | Bondley | July 7, 1953 |
| 2,752,523 | Goodall | June 26, 1956 |
| 2,753,482 | Dorgele | July 3, 1956 |